(12) United States Patent
Zloter et al.

(10) Patent No.: US 6,876,356 B2
(45) Date of Patent: Apr. 5, 2005

(54) DIGITIZER PEN

(75) Inventors: Yitzhak Zloter, Holon (IL); Gideon Shenholz, Tel Aviv (IL)

(73) Assignee: Pegasus Technologies Ltd., Azoor (IL)

( * ) Notice: Subject to any disclaimer, the term of this patent is extended or adjusted under 35 U.S.C. 154(b) by 143 days.

(21) Appl. No.: 10/098,390

(22) Filed: Mar. 18, 2002

(65) Prior Publication Data

US 2003/0173121 A1 Sep. 18, 2003

(51) Int. Cl.$^7$ .............................................. G09G 5/00
(52) U.S. Cl. ..................................... 345/179; 178/19.01
(58) Field of Search ............. 345/179; 178/19.01–19.05

(56) References Cited

U.S. PATENT DOCUMENTS

| | | | | |
|---|---|---|---|---|
| 4,814,552 A | * | 3/1989 | Stefik et al. ............ | 178/19.02 |
| 4,817,432 A | * | 4/1989 | Wallace et al. ............... | 73/602 |
| 5,163,846 A | * | 11/1992 | Lee ............................. | 434/408 |
| 5,324,201 A | * | 6/1994 | Friedel ........................ | 434/236 |
| 6,184,873 B1 | * | 2/2001 | Ward et al. .................. | 345/179 |
| 6,577,299 B1 | * | 6/2003 | Schiller et al. ............. | 345/179 |
| 6,654,008 B2 | * | 11/2003 | Ikeda et al. ................. | 345/179 |
| 6,703,570 B1 | * | 3/2004 | Russell et al. ........... | 178/19.03 |

OTHER PUBLICATIONS

Disappearing Ink http://www.uvm.edu/~tholme/fun/disink.htm.
Disappearing Ink Pen: http://www.pimall.com/nasi/dispen.html.

* cited by examiner

*Primary Examiner*—Alexander Eisen
(74) *Attorney, Agent, or Firm*—Mark M. Friedman

(57) ABSTRACT

A digitizer pen system including: a pen having an elongated body terminating in a writing tip and at least one ultrasound transducer deployed adjacent to the writing tip. The digitizer pen also includes a writing element removably inserted into the writing tip. The writing element has an end protruding from the writing tip. The digitizer pen also includes an extraction tool including a plurality of flexible leaves deployed around a central position. The flexible leaves are spaced such that, when the extraction tool is pressed onto the protruding end of the writing element, the flexible leaves grip the protruding end so as to facilitate extraction of the writing element. The elongated body has a main grip surface. The elongated body includes at least one radial projection located between the ultrasound transducer and the main grip surface.

20 Claims, 6 Drawing Sheets

US 6,876,356 B2

DIGITIZER PEN

FIELD AND BACKGROUND OF THE INVENTION

The present invention relates to a digitizer pen and, in particular, it concerns a digitizer pen configured for temporary writing including an extraction tool and a means to prevent fingers blocking communication with a base unit.

By way of introduction, a digitizer system for tracking an electronic pen enables hand written documents and drawings to be tracked and stored electronically. The electronic pen communicates with a base unit of the digitizer system using a communications method that typically includes at least one of infrared signals, ultrasound signals and other communications method. The base unit also communicates with an external device such as a personal digital assistant (PDA) to record the movements of the electronic pen or stylus.

The infrared or ultrasound transducers often need to be close to the writing tip to ensure that the movement of the writing tip is accurately recorded. Therefore, there is a problem that users may position their fingers over the region of the infrared or ultrasound transducers, thereby blocking communication between the electronic pen and the base unit.

The main body of the electronic pen also includes internal electronic circuitry, as well as a battery to power the internal electronic circuitry. The electronic pen cannot be dismantled by users. Therefore, there is a need for a front loading writing element due to the electronics in the main body of the pen. Moreover, the exposed writing element is very small therefore making its removal difficult.

There is a short-term need to see the writing of the pen on the paper being used, as writing or drawing a picture is difficult if no visible impression is left of previous pen strokes. However, long term written record is made redundant. Long term written record is also a waste of resources, requires storage space and may compromise confidentiality.

There is therefore a need for a digitizer pen configured for temporary writing including an extraction tool and a means to prevent fingers blocking communication with the base unit.

SUMMARY OF THE INVENTION

The present invention is a digitizer pen.

According to the teachings of the present invention there is provided a digitizer pen system comprising: (a) a pen having an elongated body terminating in a writing tip, the pen including a writing element removably inserted into the writing tip and at least one ultrasound transducer deployed adjacent to the writing tip, the writing element having an end protruding from the writing tip; and (b) an extraction tool including a plurality of flexible leaves deployed around a central position and spaced such that, when the extraction tool is pressed onto the protruding end of the writing element, the flexible leaves grip the protruding end so as to facilitate extraction of the writing element.

According to a further feature of the present invention the plurality of flexible leaves is implemented as at least three flexible leaves.

According to a further feature of the present invention the plurality of flexible leaves is implemented as four flexible leaves.

According to a further feature of the present invention the plurality of flexible leaves is formed from a unitary sheet of metallic material.

According to a further feature of the present invention the extraction tool is implemented as part of a cap selectively engagable with the elongated body so as to cover the writing tip of the pen.

According to a further feature of the present invention the projecting end projects from the writing tip by no more than 5 mm.

According to a further feature of the present invention substantially the entirety of the projecting end has a conically tapered form.

According to a further feature of the present invention the elongated body has a main grip surface, the elongated body including at least one radial projection located between the ultrasound transducer and the main grip surface.

According to a further feature of the present invention the radial projection is implemented as an annular projecting ridge around the elongated body.

According to a further feature of the present invention the writing element includes a quantity of disappearing ink such that a visible deposit is formed on a substrate during writing and subsequently becomes substantially invisible.

According to the teachings of the present invention there is provided a digitizer pen comprising a pen having an elongated body having a main grip surface and terminating in a tip, the pen including at least one ultrasound transducer deployed adjacent to the tip, the pen having a radial projection located between the ultrasound transducer and the main grip surface.

According to a further feature of the present invention the radial projection is implemented as an annular projecting ridge around the elongated body.

According to a further feature of the present invention the pen includes a writing element removably inserted into the tip.

According to a further feature of the present invention the writing element includes a quantity of disappearing ink such that a visible deposit is formed on a substrate during writing and subsequently becomes substantially invisible.

According to a further feature of the present invention, there is provided an extraction tool including a plurality of flexible leaves deployed around a central position and spaced such that, when the extraction tool is pressed onto the protruding end of the writing element, the flexible leaves grip the protruding end so as to facilitate extraction of the writing element.

According to a further feature of the present invention the plurality of flexible leaves is implemented as at least three flexible leaves.

According to a further feature of the present invention the plurality of flexible leaves is implemented as four flexible leaves.

According to a further feature of the present invention the plurality of flexible leaves is formed from a unitary sheet of metallic material.

According to a further feature of the present invention the extraction tool is implemented as part of a cap selectively engagable with the elongated body so as to cover the writing tip of the pen.

According to a further feature of the present invention the projecting end projects from the writing tip by no more than 5 mm.

According to a further feature of the present invention substantially the entirety of the projecting end has a conically tapered form.

According to the teachings of the present invention there is provided a digitizer pen comprising a pen having an elongated body terminating in a writing tip, the pen including a writing element associated with the writing tip and at least one ultrasound transducer deployed adjacent to the writing tip, the writing element including a quantity of disappearing ink such that a visible deposit is formed on a substrate during writing and subsequently becomes substantially invisible.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a digitizer pen configured for temporary writing and includes an extraction tool and a means to prevent fingers blocking communication with a base unit.

The principles and operation of a digitizer pen according to the present invention may be better understood with reference to the drawings and the accompanying description.

Figure 1:
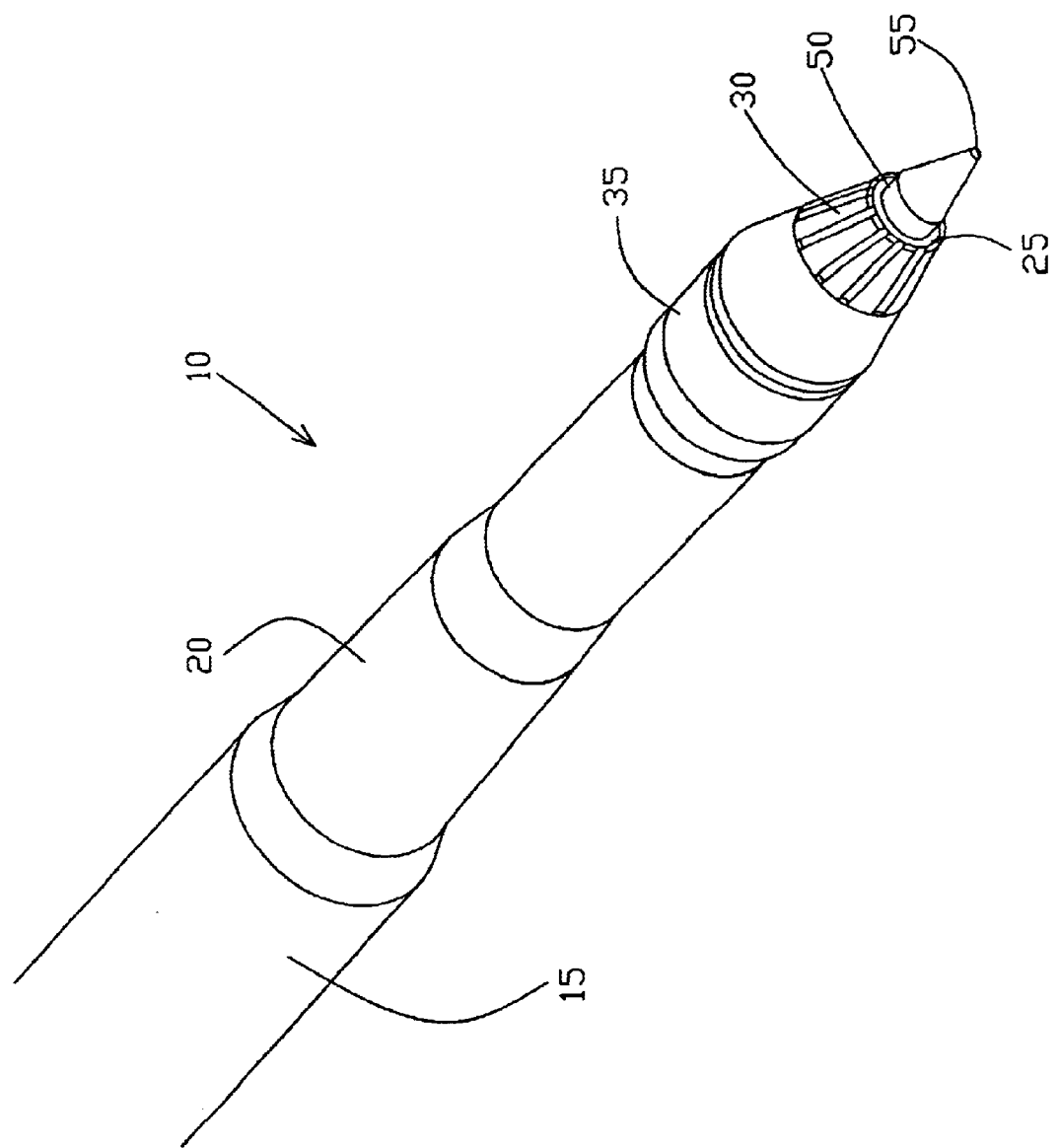
FIG. 1 is an isometric view of a digitizer pen that is constructed and operative in accordance with a preferred embodiment of the invention.
Figure 2:
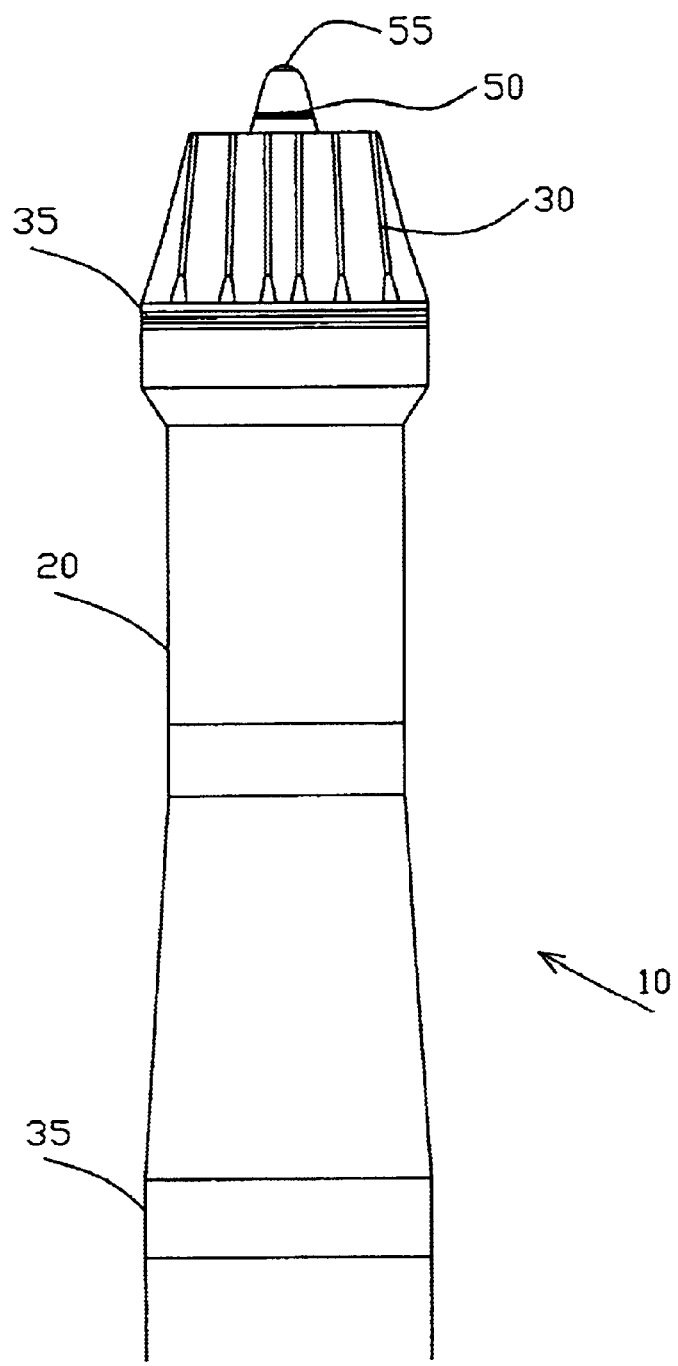
FIG. 2 is a plan view of the digitizer pen of FIG. 1.

Reference is now made to FIGS. 1 and 2, which are an isometric view and plan view, respectively, of a digitizer pen 10 that is constructed and operative in accordance with a preferred embodiment of the invention.

The digitizer pen 10 has an elongated body 15 that has a main grip surface 20 and terminates in a writing tip 25. The digitizer pen 10 includes at least one ultrasound transducer 30 deployed adjacent to the writing tip 25 below the surface of elongated body 15. To prevent users from positioning their fingers over the region of ultrasound transducer 30, digitizer pen 10 has a radial projection 35 located between the ultrasound transducer 30 and the main grip surface 20. In the most preferred embodiment of the invention radial projection 35 is implemented as an annular projecting ridge around elongated body 15. It should be noted that radial projection 35 is a relative projection compared to the portion of elongated body 15 directly above radial projection 35. Digitizer pen includes a writing element 50 that is removably inserted into writing tip 25. Writing element 50 is held within digitizer pen 10 using a pressure fit. Writing element 50 has an end 55 protruding from writing tip 25, typically by no more than 5 mm and substantially the entirety of end 55 has a conically tapered form.

Figure 3:
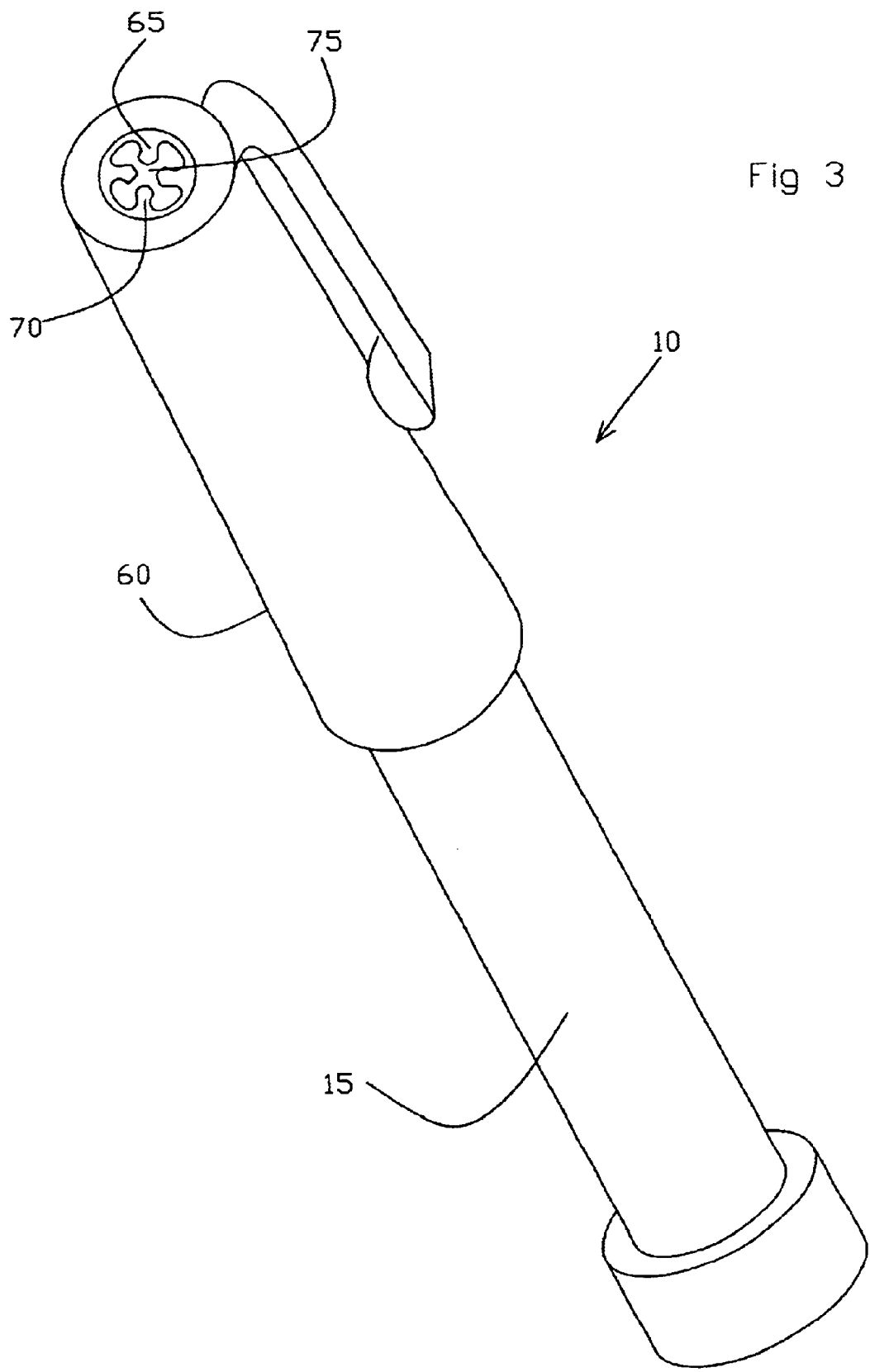
FIG. 3 is an isometric view of the digitizer pen of FIG. 1 with a pen cap that contains an extraction tool.
Figure 4:
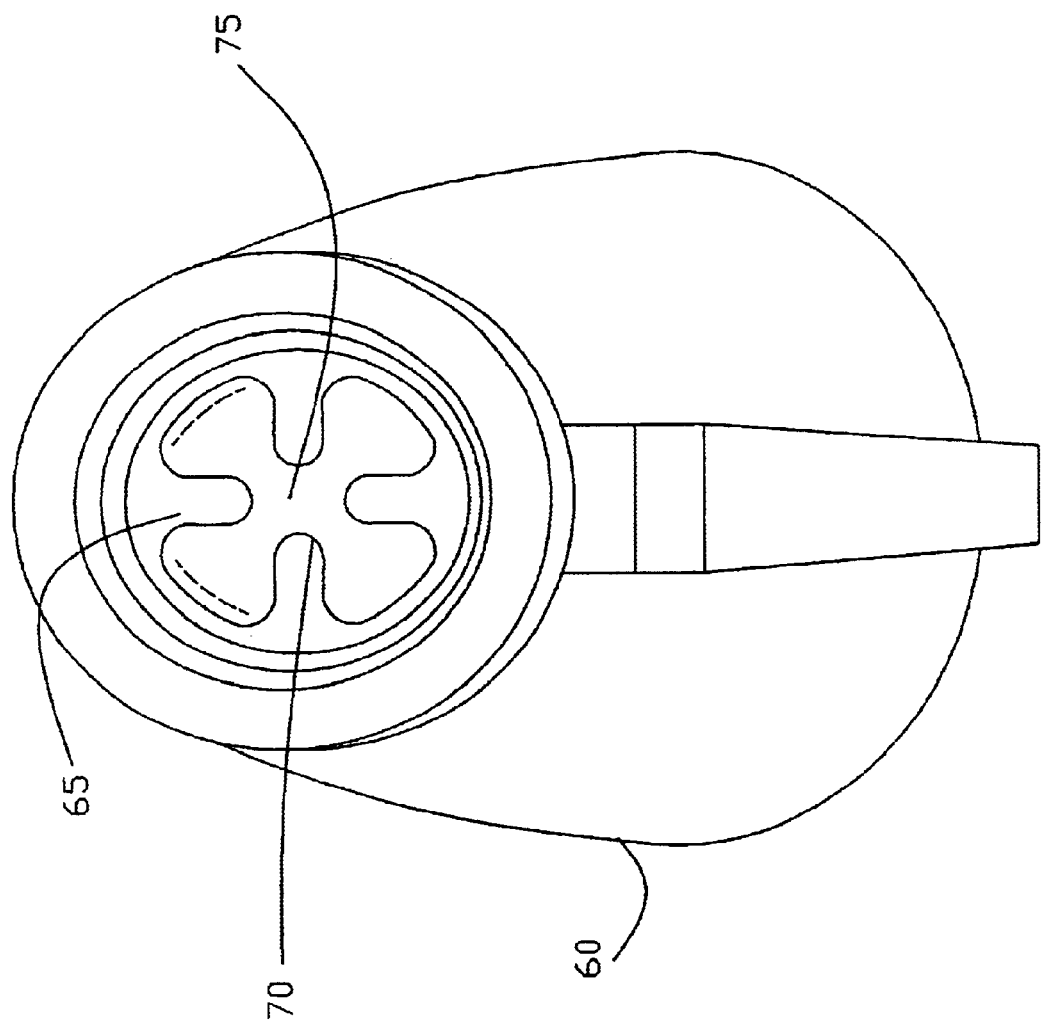
FIG. 4 is an isometric view of the pen cap of FIG. 3.

Reference is now made to FIGS. 3 and 4. FIG. 3 is an isometric view of digitizer pen 10 of FIG. 1 with a pen cap 60 that contains an extraction tool 65. FIG. 4 is an isometric view of pen cap 60 of FIG. 3. Extraction tool 65 is implemented as part of the top of cap 60. Cap 60 is selectively engagable with elongated body 15 so as to cover writing tip 25 (FIGS. 1, 2). Extraction tool 65 includes a plurality of flexible leaves 70 deployed around a central position 75. In the most preferred embodiment of the invention, extraction tool 65 contains four flexible leaves 70 deployed around central position 75 that are formed from a unitary sheet of metallic material.

Figure 7:
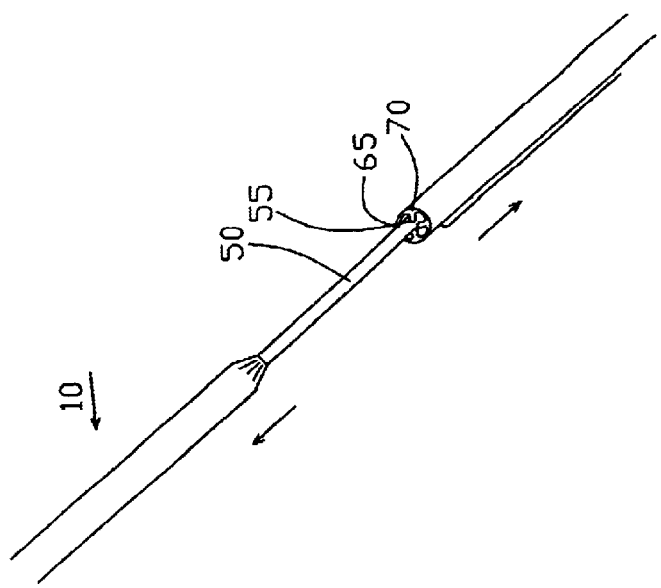
FIG. 7 is a schematic isometric view of the refill of the digitizer pen being extracted by the extraction tool of FIG. 3.
Figure 6:
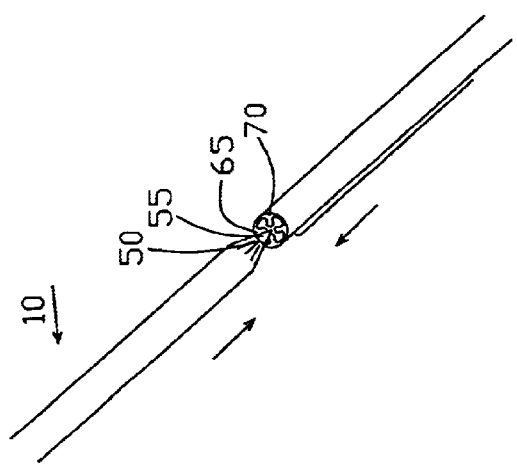
FIG. 6 is a schematic isometric view of the extraction tool and the protruding end of the writing element the digitizer pen of FIG. 3 in contact.
Figure 5:
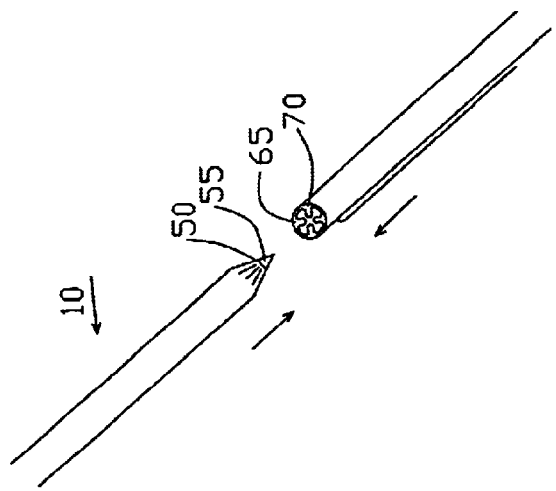
FIG. 5 is a schematic isometric view of the extraction tool and protruding end of a writing element of the digitizer pen of FIG. 3 being brought together.

Reference is now made to FIGS. 5, 6 and 7. FIG. 5 is a schematic isometric view of extraction tool 65 and protruding end 55 of writing element 50 of digitizer pen 10. FIG. 6 is a schematic isometric view of extraction tool 65 and protruding end 55 of writing element 50 of digitizer pen 10 in contact. FIG. 7 is a schematic isometric view of writing element 50 of digitizer pen 10 being extracted by extraction tool 65. Flexible leaves 70 are spaced such that, when extraction tool 65 is pressed onto protruding end 55 of writing element 50, flexible leaves 70 grip protruding end 55 so as to facilitate extraction of writing element 50.

By way of introduction, there is a short-term need to see the writing of digitizer pen 10 on the paper being used, as writing or drawing a picture is difficult if no visible impression is left of previous pen strokes. However, long term written record is made redundant. Therefore, this problem can be solved by making the ink visible temporarily, typically by using disappearing ink.

Figure 8:
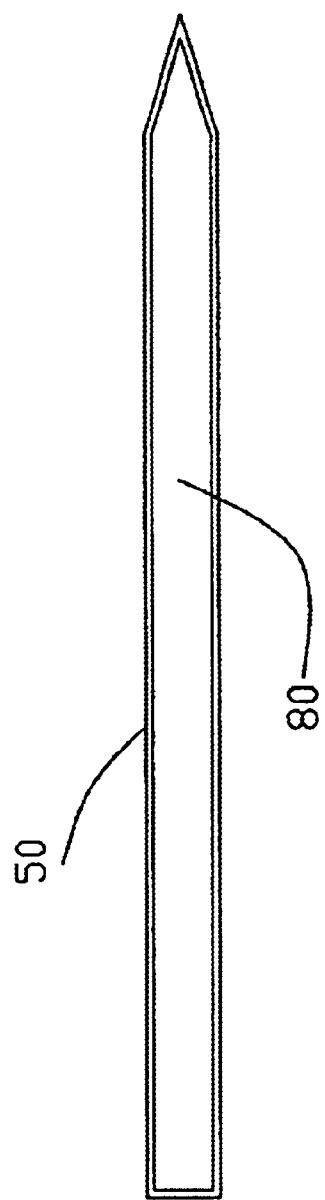
FIG. 8 is a schematic longitudinal cross-sectional view of a writing containing disappearing ink for use with the digitizer pen of FIG. 1.

Reference is now made to FIG. 8, which is a schematic longitudinal cross-sectional view of writing element 50 containing a quantity of disappearing ink 80 for use with the digitizer pen of FIG. 1. Writing element 50 includes a quantity of disappearing ink 80 such that a visible deposit is formed on a substrate during writing and subsequently becomes substantially invisible. Disappearing ink works because a particular molecule in the solution, typically thymophthalein, is blue in solutions that are basic. The same molecule is colorless under neutral conditions. When disappearing ink is used on paper, part of the solution evaporates, typically ethanol alcohol, and instead of being basic the result is a neutral reside being leftover solid. With the evaporation, the thymophthalein is no longer experiencing basic conditions so it changes colors and "disappears".

It will be appreciated that the above descriptions are intended only to serve as examples, and that many other embodiments are possible within the spirit and the scope of the present invention.

What is claimed is:

1. A digitizer pen system comprising:
   (a) a pen having an elongated body terminating in a writing tip, said pen including a writing element removably inserted into said writing tip and at least one ultrasound transducer deployed adjacent to said writing tip, said writing element having an end protruding from said writing tip; and
   (b) an extraction tool including a plurality of flexible leaves deployed around a central position and spaced such that, when said extraction tool is pressed onto said protruding end of said writing element, said flexible leaves grip said protruding end so as to facilitate extraction of said writing element.

2. The digitizer pen system of claim 1, wherein said plurality of flexible leaves is implemented as at least three flexible leaves.

3. The digitizer pen system of claim 1, wherein said plurality of flexible leaves is implemented as four flexible leaves.

4. The digitizer pen system of claim 1, wherein said plurality of flexible leaves is formed from a unitary sheet of metallic material.

5. The digitizer pen system of claim 1, wherein said extraction tool is implemented as part of a cap selectively engagable with said elongated body so as to cover said writing tip of said pen.

6. The digitizer pen system of claim 1, wherein said projecting end projects from said writing tip by no more than 5 mm.

7. The digitizer pen system of claim 1, wherein substantially the entirety of said projecting end has a conically tapered form.

8. The digitizer pen system of claim 1, wherein said elongated body has a main grip surface, said elongated body including at least one radial projection located between said ultrasound transducer and said main grip surface.

9. The digitizer pen of claim 8, wherein said radial projection is implemented as an annular projecting ridge around said elongated body.

10. The digitizer pen system of claim 1, wherein said writing element includes a quantity of disappearing ink such that a visible deposit is formed on a substrate during writing and subsequently becomes substantially invisible.

11. A digitizer pen comprising a pen having an elongated body having a main grip surface and terminating in a tip, said pen including at least one ultrasound transducer deployed adjacent to said tip, said pen having a radial projection, said main grip surface having a radial depression, said radial depression being adjacent to said radial projection, said radial projection being located between said ultrasound transducer and said main grip surface, said radial depression and said radial projection being configured to avoid said at least one ultrasound transducer from being even partially covered by the fingers of a user gripping the pen, said pen including a writing element removably inserted into said tip, said writing element including a quantity of disappearing ink such that a visible deposit is formed on a substrate during writing and subsequently becomes substantially invisible.

12. The digitizer pen of claim 11, wherein said radial projection is implemented as an annular projecting ridge around said elongated body.

13. The digitizer pen of claim 11, further comprising an extraction tool including a plurality of flexible leaves deployed around a central position and spaced such that, when said extraction tool is pressed onto said protruding end of said writing element, said flexible leaves grip said protruding end so as to facilitate extraction of said writing element.

14. The digitizer pen system of claim 13, wherein said plurality of flexible leaves is implemented as at least three flexible leaves.

15. The digitizer pen system of claim 13, wherein said plurality of flexible leaves is implemented as four flexible leaves.

16. The digitizer pen system of claim 13, wherein said plurality of flexible leaves is formed from a unitary sheet of metallic material.

17. The digitizer pen system of claim 13, wherein said extraction tool is implemented as part of a cap selectively engagable with said elongated body so as to cover said writing tip of said pen.

18. The digitizer pen system of claim 13, wherein said projecting end projects from said writing tip by no more than 5 mm.

19. The digitizer pen system of claim 13, wherein substantially the entirety of said projecting end has a conically tapered form.

20. A digitizer pen comprising a pen having an elongated body terminating in a writing tip, said pen including a writing element associated with said writing tip and at least one ultrasound transducer deployed adjacent to said writing tip, said writing element including a quantity of disappearing ink such that a visible deposit is formed on a substrate during writing and subsequently becomes substantially invisible.

* * * * *